United States Patent [19]
Saito

[11] Patent Number: 5,377,893
[45] Date of Patent: Jan. 3, 1995

[54] ULTRASONIC TAPE GUIDE DEVICE

[75] Inventor: Etsuro Saito, Kanagawa, Japan

[73] Assignee: Sony Corporation, Tokyo, Japan

[21] Appl. No.: 923,459

[22] Filed: Aug. 3, 1992

[30] Foreign Application Priority Data

Aug. 8, 1991 [JP] Japan .................. 3-199502

[51] Int. Cl.⁶ ............................... B65H 27/00
[52] U.S. Cl. .................... 226/196; 226/194; 242/907
[58] Field of Search .......... 226/194, 196, 197, 198, 226/200; 242/76

[56] References Cited

U.S. PATENT DOCUMENTS

| | | | |
|---|---|---|---|
| 4,573,619 | 3/1986 | Grant | 226/196 X |
| 4,875,610 | 10/1989 | Kitamoto et al. | 226/10 |
| 5,152,444 | 10/1992 | Saito | 226/196 |

FOREIGN PATENT DOCUMENTS

| | | |
|---|---|---|
| 100284 | 2/1984 | European Pat. Off. . |
| 333692 | 5/1985 | Germany . |
| 664213 | 5/1979 | U.S.S.R. . |
| 698051 | 11/1979 | U.S.S.R. . |
| 900311 | 1/1982 | U.S.S.R. . |

*Primary Examiner*—Daniel P. Stodola
*Attorney, Agent, or Firm*—William S. Frommer; Alvin Sinderbrand

[57] ABSTRACT

An ultrasonic tape guide device for use in a video tape recorder, for example, has a tubular tape guide disposed around and supported on a shaft mounted on a base. A substantially flat piezoelectric ultrasonic vibrator for vibrating the tubular tape guide in an axial direction thereof has one surface fixed to the tubular tape guide and an opposite free surface facing away from the tubular gape guide. When the piezoelectric ultrasonic vibrator is energized to vibrate the tubular tape guide, a magnetic tape is guided smoothly around the tubular tape guide with a low coefficient of friction.

1 Claim, 5 Drawing Sheets

ULTRASONIC TAPE GUIDE DEVICE

BACKGROUND OF THE INVENTION

1. Field of the Invention

The present invention relates to a tape guide device for use in a video tape recorder or the like.

2. Description of the Prior Art

Tape guides for use in video tape recorders or the like are roughly classified into rotary tape guides and fixed tape guides.

The rotary tape guides are advantageous in that they impose less resistance to tapes guided thereby. However, the speeds of travel of the tapes guided by the rotary tape guides tend to reflect irregularities in the rotational speeds of bearings used in the rotary tape guides. Furthermore, if the direction in which a tape travels when it is guided by a rotary tape guide is not perpendicular to the axis of rotation of the rotary tape guide, then the tape is subjected to a transverse force applied by the tape guide. The latter drawback is aggravated when the tape is transversely shifted until an edge thereof is damaged by contact with a flange of the rotary tape guide, for example. Therefore, rotary tape guides are required to be machined and assembled with high accuracy, and hence cannot be manufactured easily.

The fixed tape guides allow tapes guided thereby to run stably, but present large resistance to the running tapes.

There has been a demand for a fixed tape guide which imposes smaller resistance to a running tape. One of such fixed tape guides that meet such a demand is an air tape guide for ejecting air from small holes defined in the surface of a guide body to float a tape off the guide body for thereby reducing the resistance applied to the tape. The air tape guide is still problematic since a compressor is required as an air pressure source.

To eliminate the drawbacks of the conventional tape guides, there has been proposed an ultrasonic vibration tape guide device as disclosed in Japanese patent application No. 02-103627. The ultrasonic vibration tape guide device employs an ultrasonic energy to reduce resistance to a running tape while allowing the tape to run stably as with fixed tape guides. The ultrasonic vibration tape guide device is adjustable in height. The proposed ultrasonic vibration tape guide device will be described below with reference to FIG. 1 of the accompanying drawings.

As shown in FIG. 1, the ultrasonic vibration tape guide device, generally designated by the reference numeral 1, includes a main shaft 5 mounted vertically on a base 18, and a laminated ultrasonic vibrator 3 fixed to a guide member 2 that is supported on support teeth 7b of a cylindrical support shaft 7 of brass.

The ultrasonic vibrator 3 comprises a piezoelectric element having a number of piezoelectric ceramic plates with positive and negative electrodes interposed alternately therebetween. The positive electrodes are electrically connected to a positive electrode plate on one side, and the negative electrodes are electrically connected to a negative electrode plate on another side. An insulating member is attached to one end surface of the piezoelectric ceramic element, with the other end surface serving as a fixing surface.

A positive lead 3a is connected to the positive electrode plate of the ultrasonic vibrator 3, whereas a negative lead 3b is connected to the negative electrode plate of the ultrasonic vibrator 3.

The end surface as the fixing surface of the ultrasonic vibrator 3 is of a curved shape complementary to an outer circumferential surface of the guide member 2, and is bonded thereto.

The ultrasonic vibrator 3 has a length of about 4.5 mm in the radial direction of the guide member 2 such that it can apply a sufficient amount of vibratory energy to the guide member 2 when expanded and contracted in response to electric energy supplied thereto over the leads 3a, 3b.

Lower and upper flanges 9, 10 are disposed in abutment against lower and upper ends, respectively, of the support shaft 7, for guiding opposite edges of a tape wound around the guide member 2.

The main shaft 5 extends through the lower and upper flanges 9, 10 and the support shaft 7. A height adjustment screw 6 is fitted in an upper end of the support shaft 7, and threaded over a screw 23 on the upper end of the main shaft 5.

The upper flange 10 is fastened to an upper end surface of an attachment 8 by a screw 15. The lower flange 9 is fixed to a lower end surface of the attachment 8 by fixing pins 22, 24.

The attachment 8 has an ultrasonic vibrator storage space 8a defined therein which houses the ultrasonic vibrator 3 therein. As shown in FIG. 2 of the accompanying drawings, the ultrasonic vibrator storage space 8a is defined as a hole in the shape of a rectangular parallelepiped between side walls 8b having respective stopper insertion holes 8c defined therein.

Disc-shaped stoppers 39 of rubber have engaging protrusions 39a fitted respectively in the stopper insertion holes 8c. The ultrasonic vibrator 3 is sandwiched between the stoppers 39 to prevent the guide member 2 from rotating with respect to the attachment 8.

The attachment 8 keeps the lower and upper flanges 9, 10 parallel to each other and spaced from each other by a distance that is about 0.1 mm larger than the length of the guide member 2.

As shown in FIG. 1, the lower flange 9 is normally urged upwardly under the bias of a coil spring 35 disposed around the main shaft 5 between the lower flange 9 and the base 18. The base 18 has a pin insertion hole 20 in which there is inserted an end of the fixing pin 22 that projects downwardly from the lower flange 9.

When the height adjustment screw 6 is turned, the guide member 2 is adjusted in height under or against the bias of the coil spring 35.

FIG. 3 of the accompanying drawings shows standing wave vibrations caused of the guide member 2 when an AC voltage is applied to the ultrasonic vibrator 3, the standing-wave vibrations being illustrated along line X—X. Dotted lines N represent nodes on the guide member 2 where the vibrations have zero amplitude. The nodes N on the guide members 2 are axially spaced from the ends of the guide members 2 by a distance n, and the support teeth 7b are also axially spaced from the ends of the guide member 2 by the distance n, i.e., are positioned at the nodes N.

The ultrasonic vibrator 3 that is positioned substantially centrally in the longitudinal direction of the guide member 2 can be expanded and contracted in the radial direction of the guide member 2 for applying standing wave vibrations to the guide member 2.

As described above, the length of the ultrasonic vibrator 3 in the radial direction of the guide member 2 is about 4.5 mm. However, the ultrasonic vibrator 3 with the length of about 4.5 mm makes the tape guide device 1 relatively large in size when used in video tape recorders, and hence cannot meet a growing demand for smaller tape guide devices.

The laminated ultrasonic vibrator 3 is of a complex structure including a number of piezoelectric ceramic plates with positive and negative electrodes interposed alternately therebetween, each of the piezoelectric ceramic plates having a thickness of 0.2 mm or smaller. Since laminated ultrasonic vibrators of such a complex structure are generally highly expensive, the cost of tape guide devices and video tape recorders incorporating such laminated ultrasonic vibrators is relatively high. Therefore, the conventional tape guide devices incorporating such laminated ultrasonic vibrators are one of the factors which make video tape recorders with the conventional tape guide devices relatively expensive on the market.

OBJECTS AND SUMMARY OF THE INVENTION

In view of the aforesaid drawbacks of the conventional ultrasonic tape guide devices, it is an object of the present invention to provide an ultrasonic tape guide device which is relatively small in size and inexpensive to manufacture.

According to the present invention, there is provided an ultrasonic tape guide device comprising a shaft, a tubular tape guide for guiding a tape therearound, the tubular tape guide being disposed around and supported on the shaft, and a substantially flat piezoelectric ultrasonic vibrator for vibrating the tubular tape guide in an axial direction thereof, the piezoelectric ultrasonic vibrator having one surface fixed to the tubular tape guide and an opposite free surface facing away from the tubular gape guide.

The tubular guide member may have a flat surface on an outer circumferential surface thereof, and the piezoelectric ultrasonic vibrator may have a flat surface fixedly mounted on the flat surface of the guide member.

Alternatively, the ultrasonic tape guide device may further include a converter having a concave surface complementarily fixed to an outer circumferential surface of the tubular guide member, and a flat surface facing away from the tubular guide member, the piezoelectric ultrasonic vibrator having a flat surface fixedly mounted on the flat surface of the converter.

The piezoelectric ultrasonic vibrator may have a concave surface complementarily fixed to an outer circumferential surface of the tubular guide member, and a convex surface facing away from the tubular guide member.

Since the tubular guide member is vibrated in its axial direction by the substantially flat piezoelectric ultrasonic vibrator, the ultrasonic tape guide device is relatively small in size and inexpensive to manufacture.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

Figure 1:
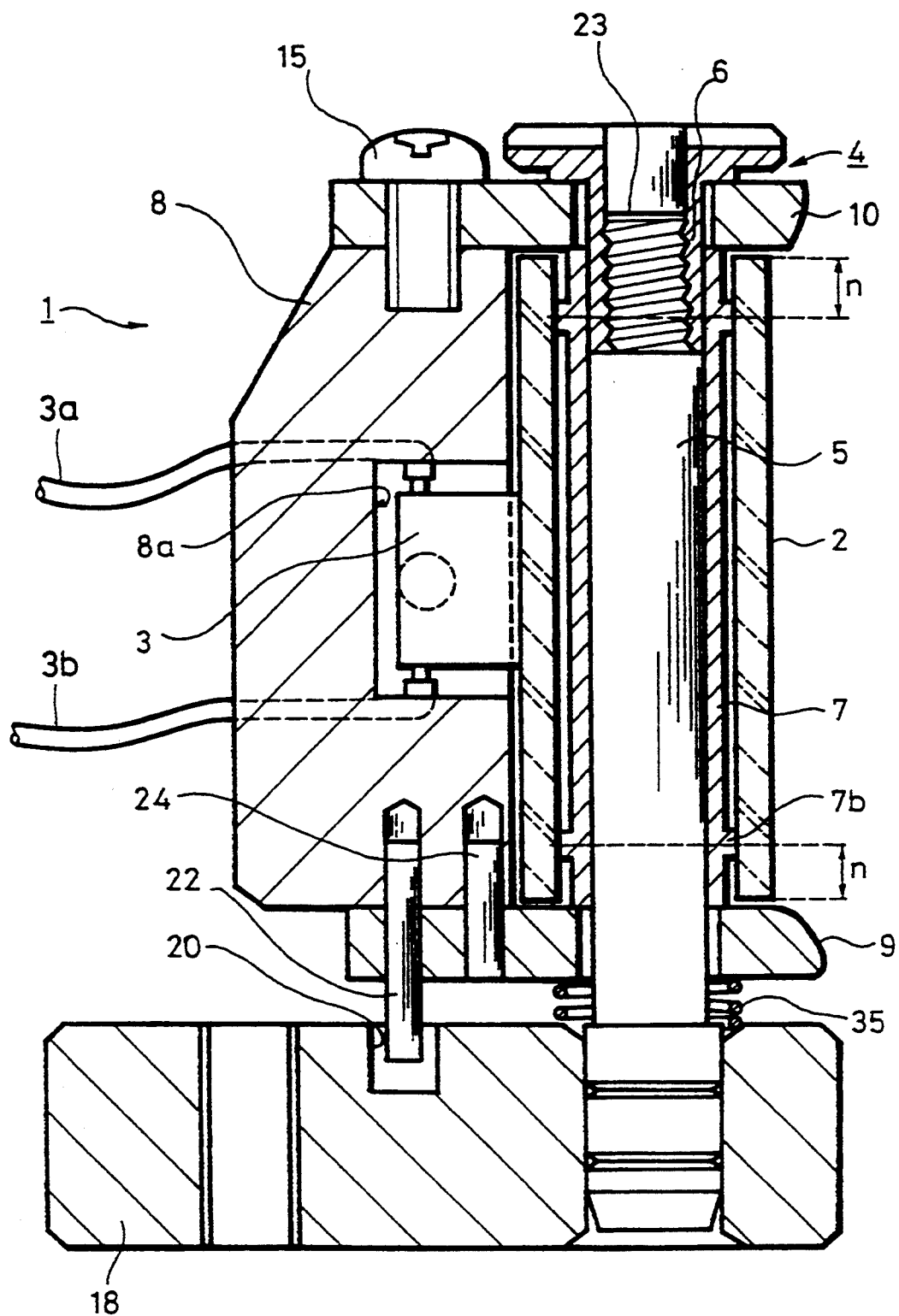
FIG. 1 is a cross-sectional view of a conventional ultrasonic tape guide device.
Figure 2:
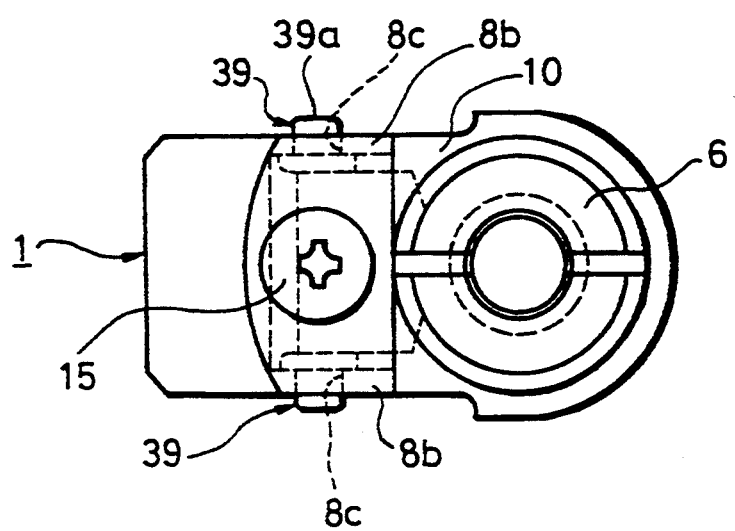
FIG. 2 is a plan view of the conventional ultrasonic tape guide device.

Like or corresponding parts are denoted by like or corresponding reference characters throughout views.

Figure 4:
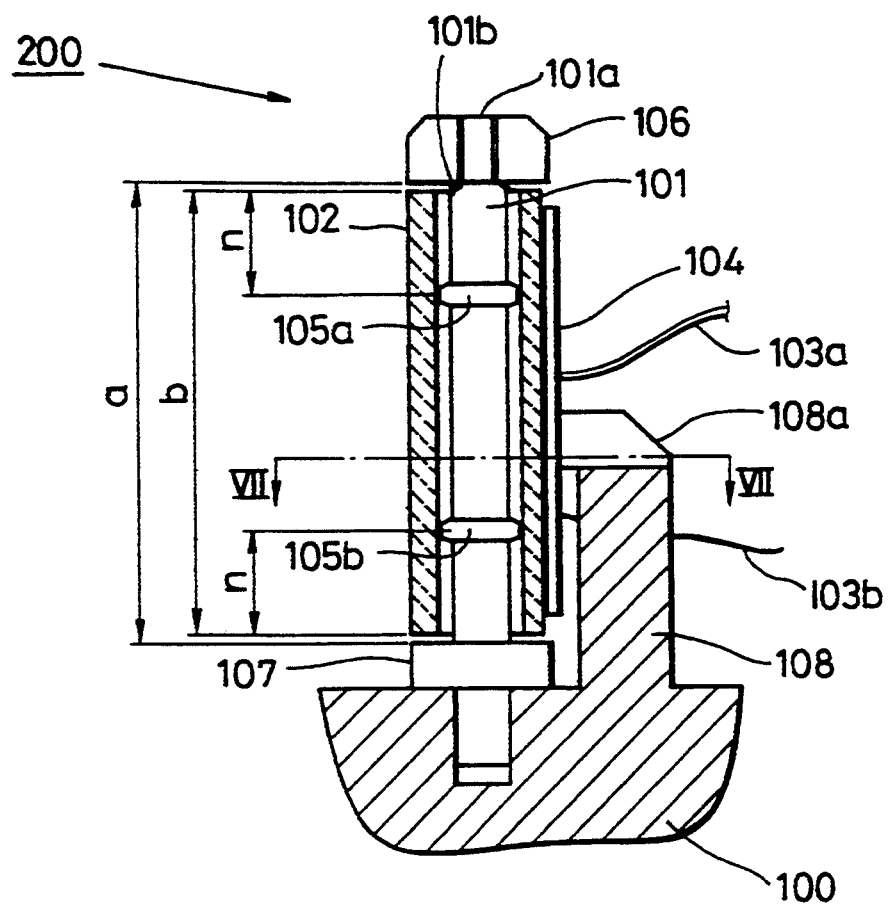
FIG. 4 is a cross-sectional view of an ultrasonic tape guide device according to an embodiment of the present invention.

FIG. 4 shows an ultrasonic tape guide device, generally designated by the reference numeral 200, according to an embodiment of the present invention.

As shown in FIG. 4, the ultrasonic tape guide device 200 includes a main shaft 101 having a lower end mounted vertically on a base 100 and a threaded upper end 101a. The main shaft 101 has a shoulder 101b immediately below the threaded upper end 101a. A boss 107 is attached to the main shaft 101 immediately upwardly of the lower end thereof and held against an upper surface of the base 100.

The main shaft 101 has a pair of axially spaced support teeth 105a, 105b. A tubular guide member 102 of ceramics is fitted over the main shaft 101 in contact with the support teeth 105a, 105b. A retainer nut 106 is threaded over the threaded upper end 101a of the main shaft 101 for preventing the tubular guide member 102 from being detached from the main shaft 101.

When the boss 107, the tubular guide member 102, and the retainer nut 106 are installed in place, the tubular guide member 102 is axially positioned between the boss 107 and the retainer nut 106. At this time, the shoulder 101b of the main shaft 101 is axially spaced from the upper end of the boss 107 by a distance a, and the guide member 102 has an axial length b. The distance a and the length b are related to each other by: a =b +0.1 1.

Since the retainer nut 106 is stopped by the shoulder 101b, when the guide member 102 is positioned between the upper end of the boss 107 and the lower end of the retainer nut 106, there is a gap of about 0.1 mm created between the guide member 102, and the boss 107 and the retainer nut 106.

Figure 6:
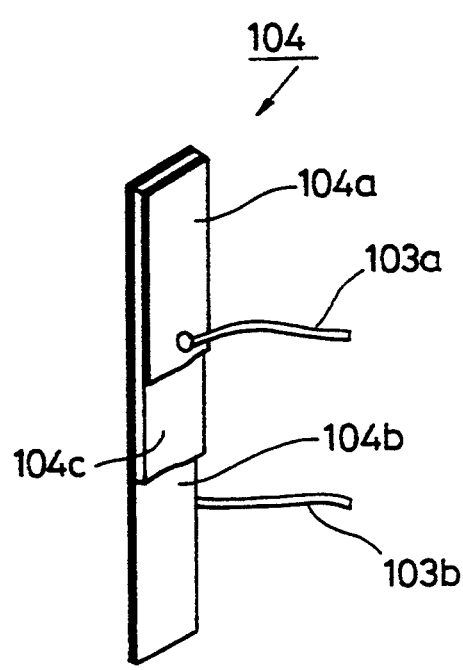
FIG. 6 is a perspective view of an ultrasonic vibrator of the ultrasonic tape guide device shown in FIG. 4.

The ultrasonic tape guide 200 has a flat laminated ultrasonic vibrator 104 fixed to the guide member 102. As shown in FIG. 6, the ultrasonic vibrator 104 comprises a plate-like piezoelectric element 104c of ceramics, and a pair of electrodes 104a, 104b attached respectively to opposite sides of the piezoelectric element 104c. A lead 103a is connected to the electrode 104a, and a lead 103b is connected to the electrode 104b.

Figure 5:
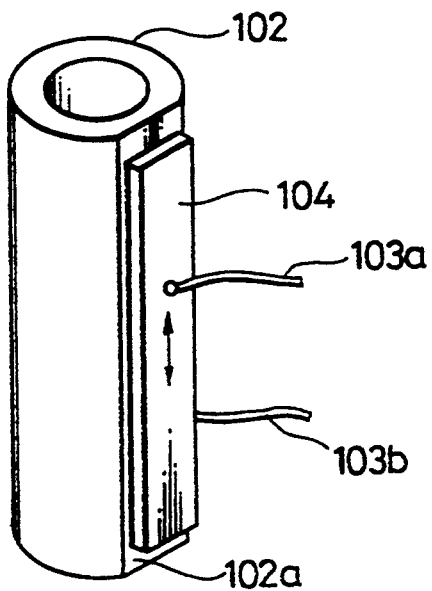
FIG. 5 is a perspective view of the ultrasonic tape guide device shown in FIG. 4.

As shown in FIG. 5, the guide member 102 has a flat outer circumferential surface 102a, and the ultrasonic vibrator 104 is fixedly mounted on the flat surface 102a.

The ultrasonic vibrator 104 can be expanded and contracted in the axial direction of the guide member 102 as indicated by the arrows.

Figure 3:
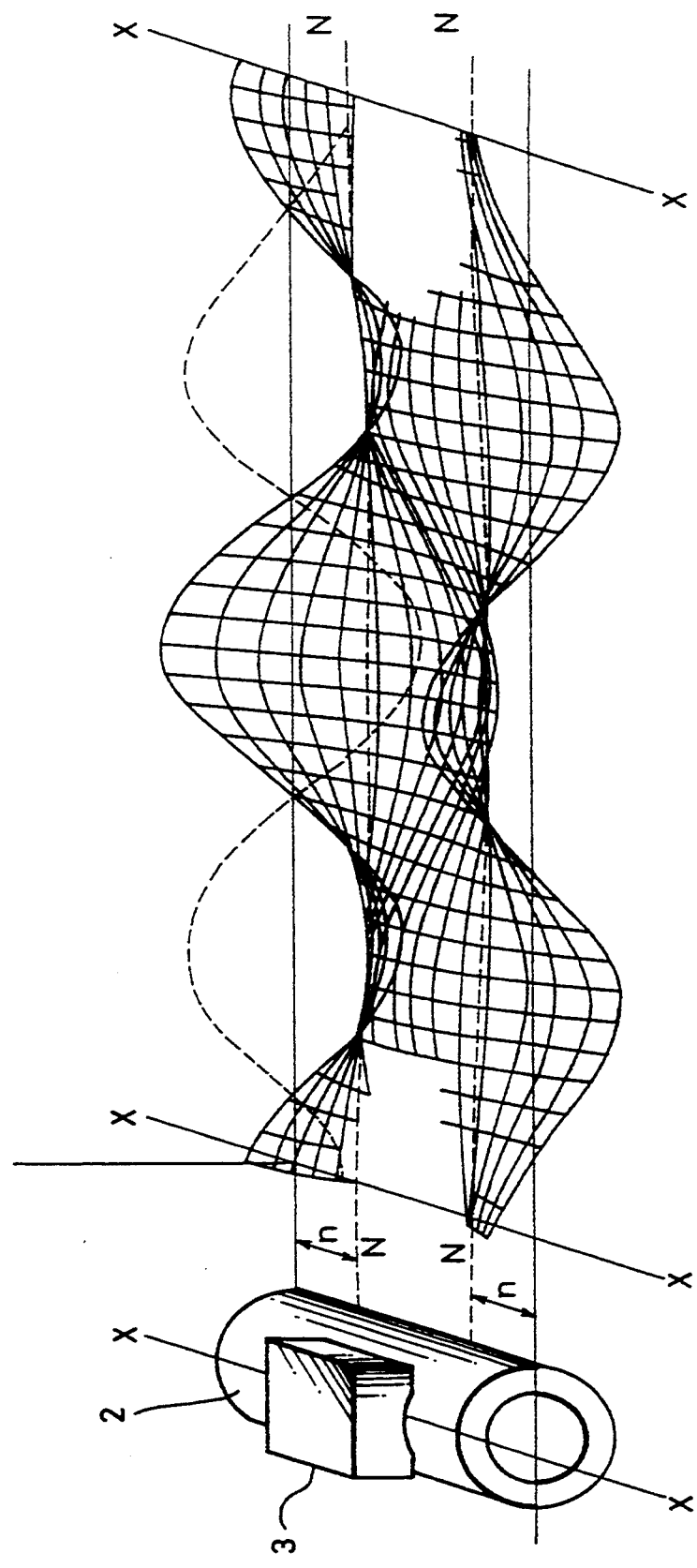
FIG. 3 is a graph showing standing-wave vibrations of the conventional ultrasonic tape guide device.

The support teeth 105a, 105b are positioned on the main shaft 101 as follows:

When an alternating voltage is applied from a driver circuit (not shown) to the ultrasonic vibrator 104 through the leads 103a, 103b, the ultrasonic vibrator 104 vibrates the guide member 102 in a pattern indicated by the standing wave shown in FIG. 3. The guide member 2 and the ultrasonic vibrator 3 in FIG. 3 correspond respectively to the guide member 102 and the ultrasonic vibrator 104 in FIG. 4. In FIG. 3, the dotted lines N represent nodes on which the vibrations have zero amplitude. With the guide member 102 supported on the main shaft 101 along the dotted lines N, therefore, the vibration of the guide member 102 is minimized. The nodes N are axially spaced from the ends of the guide members by a distance n in FIG. 3, and the support teeth 105a, 105b are also axially spaced from the ends of the guide member 102 by the distance n, i.e., are positioned at the nodes N in FIG. 4.

Figure 7:
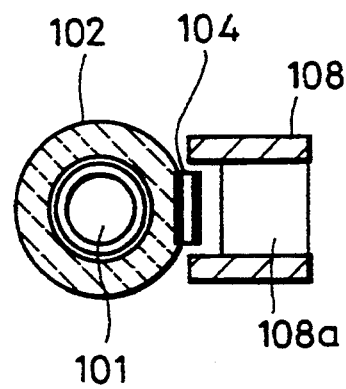
FIG. 7 is a cross-sectional view taken along line VII—VII of FIG. 4.

As shown in FIG. 4, the base 100 has a guide stop 108 projecting upwardly and having a recess 108a defined therein. As shown in FIG. 7, the ultrasonic vibrator 104 fixed to the guide member 102 is fitted in the recess 108a. Therefore, the guide member 102 is prevented by the guide stop 108 from rotating around the main shaft 101.

A magnetic tape (not shown) is trained around and guided by the guide member 102. When an alternating voltage having a frequency corresponding to the resonant frequency of the guide member 102 is applied from the driver circuit to the ultrasonic vibrator 104 through the leads 103a, 103b, the ultrasonic vibrator 104 applies standing-wave vibrations to the guide member 102. At this time, the coefficient of friction between the tape and the guide member 102 is much smaller than would be if the tape were guided with no alternating voltage applied to the ultrasonic vibrator 104.

As described above, the ultrasonic vibrator 104 is of a flat plate-like configuration and vibrates the guide member 102 in the axial direction. Therefore, the ultrasonic tape guide device 200 may be made up of a relatively small number of parts, can be manufactured with ease, may be of a small size, and relatively inexpensive. Accordingly, the ultrasonic tape guide device 200 can easily be assembled and manufactured.

Figure 8:
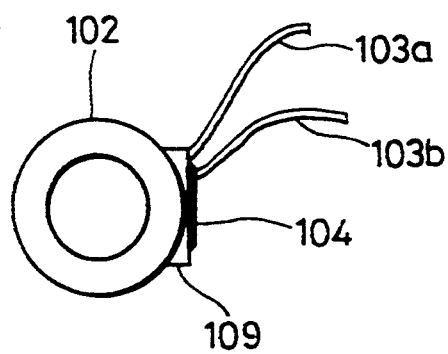
FIG. 8 is a plan view of an ultrasonic tape guide device according to another embodiment of the present invention.

FIG. 8 shows another embodiment of the ultrasonic tape guide device according to the present invention. As shown in FIG. 8, the tubular guide member 102 has no flat surface on its outer circumferential surface. A converter 109 has a concave surface shaped complementarily to a portion of the outer circumferential surface of the guide member 102 and an opposite flat surface facing away from the guide member 102. The converter 109 is fixed to the guide member 102 such that the concave surface thereof is held against the outer circumferential surface of the guide member 102. The flat ultrasonic vibrator 104 is fixedly mounted on the flat surface of the converter 109.

The other structural details of the ultrasonic tape guide device shown in FIG. 8 are the same as those of the ultrasonic tape guide device 200 shown in FIG. 4.

The ultrasonic tape guide device shown in FIG. 8 operates in the same manner and offers the same advantages as the ultrasonic tape guide device 200 shown in FIG. 4.

In addition, the guide member 102 can be manufactured with ease as its outer circumferential surface has no flat surface.

Figure 9:
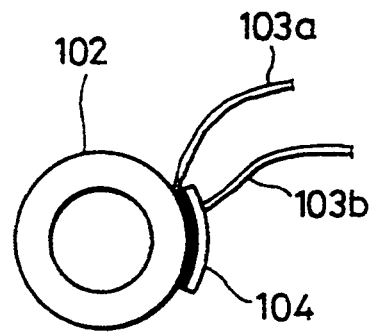
FIG. 9 is a plan view of an ultrasonic tape guide device according to still another embodiment of the present invention.

FIG. 9 shows still another embodiment of ultrasonic tape guide device according to the present invention. As shown in FIG. 9, the tubular guide member 102 has no flat surface on its outer circumferential surface. A substantially flat ultrasonic vibrator 110 has a concave surface shaped complementarily to a portion of the outer circumferential surface of the guide member 102. The ultrasonic vibrator 104 is fixed to the guide member 102 such that the curved concave surface thereof is held against the outer circumferential surface of the guide member 102. The ultrasonic vibrator 102 has an opposite convex surface facing away from the guide member 102.

The ultrasonic tape guide device shown in FIG. 9 operates in the same manner and offers the same advantages as the ultrasonic tape guide device 200 shown in FIG. 4.

Furthermore, the guide member 102 can be manufactured with ease as its outer circumferential surface has no flat surface, and no converter is required between the guide member 102 and the ultrasonic vibrator 104.

The ultrasonic vibrator 104 may be replaced with a bimorph cell which comprises two bonded piezoelectric plates associated with respective electrodes.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. An ultrasonic tape guide device comprising:
   a shaft;
   a tubular tape guide for guiding a tape therearound, said tubular tape guide having a given length and being disposed around and supported on said shaft said tubular tape guide also having a flat surface on an outer circumferential surface thereof; and
   a longitudinally extending piezoelectric ultrasonic vibrator formed of a substantially flat plate-like configuration for vibrating said tubular tape guide in an axial direction thereof, said piezoelectric ultrasonic vibrator having a length not greater than said given length and being fixed to said tubular tape guide said, piezoelectric ultrasonic vibrator having a partially unconfined free surface facing away from said tubular tape guide, and a pair of electrodes attached respectively to opposite sides of said piezoelectric ultrasonic vibrator, said piezoelectric ultrasonic vibrator also having a flat surface fixedly mounted on said flat surface of the guide member.

* * * * *